(No Model.)
M. WHITE.
NUT LOCK.
No. 592,896. Patented Nov. 2, 1897.
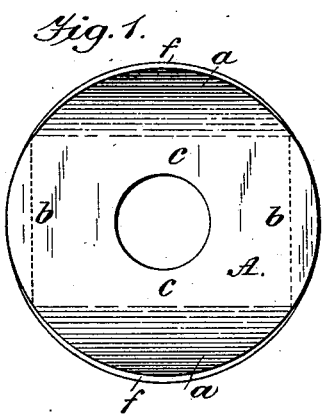
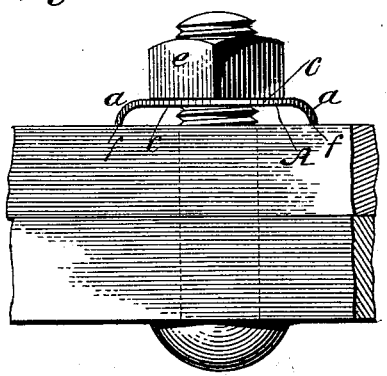 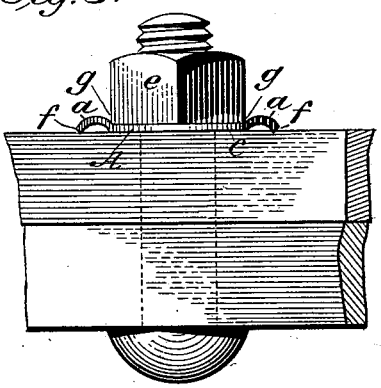
WITNESSES:
A. E. Dieterich
E. C. Walford
INVENTOR
Monroe White
BY
Fred G. Dieterich
ATTORNEY.

UNITED STATES PATENT OFFICE.

MONROE WHITE, OF VANCOUVER, CANADA, ASSIGNOR OF ONE-HALF TO ROBERT B. ELLIS AND GUY MACGOWAN, OF SAME PLACE.

NUT-LOCK.

SPECIFICATION forming part of Letters Patent No. 592,896, dated November 2, 1897.

Application filed February 13, 1897. Serial No. 623,275. (No model.)

*To all whom it may concern:*

Be it known that I, MONROE WHITE, a citizen of the United States, residing at Vancouver, in the Province of British Columbia, Canada, have invented a new and useful Nut-Lock, of which the following is a specification.

My invention relates to improvements in nut-locks of the washer class, and its object is to provide a device that is cheap to make, simple to apply, and which is very effective.

The accompanying drawings form a part of this specification, in which—

Figure 1 is a plan view of the lower side of my improved washer that is intended to engage the side opposite the nut. Fig. 2 is an edge view of the same with the nut ready to be screwed down. Fig. 3 shows my nut-lock after the nut has been screwed down, showing its adaptability in preventing the nut from becoming loosened by vibration.

In the said drawings, A represents a cylindrical washer having its opposite edges turned downward from the level plane, the curves formed thereby extending but a short distance from the edges toward the center, as *a*, and the balance of the washer being of level plane throughout, as *b b* and *c c*.

As shown in Fig. 3, when the nut is screwed down, owing to the sharp curves on the opposite sides *a* of the washer, the level plane *b* and *c* will be carried to a level bearing beneath the nut and the opposite body engaged; but the curves *a* will form swells, which will bind at *f* their extreme engagements and at the corners of the nut, as *g*, and thus having fastened the nut down it cannot be released by vibration or strain, as the corners of the said nut will not pass the swells on its opposite sides.

When it is found that the nut will occupy all of the available space on one or two of its sides, I provide the modification by cutting off one or two sides of the washer to suit the available space, as shown by dotted lines in Fig. 1.

In the manufacture of my device the washers are stamped from good steel in the different sizes and forms required. Then comes my invention, which consists in turning the two opposite sides of the washer, as *a*, and tempering the same, so as to make them resilient and always furnish a resisting force against the corners of a nut when screwed down.

It will be seen from the foregoing that, although my invention is but a form of washer treated to serve a double purpose and its manufacture is simple in the extreme, therefore its use may be universal.

I am aware that prior to my invention circular washers have been employed in a variety of forms for tension-springs and for other purposes, the form most parallel to mine being a circular washer bent in the shape of an arc or of concavo-convex form. This is ineffective as a nut-lock, for the reason that its highest point engages the nut near its axis, and therefore reduces its power of resistance.

Having thus described my invention, what I claim as new is—

A nut-lock, comprising a plate consisting of a flat central portion, the ends of which are curved inwardly as at *a*, and deflected from the flat portion of the plate, said curved ends having a resiliency greater than that of the flat portion of the plate, whereby when the end is screwed home against the flat part of the lock-plate the biting edges of the curved resilient ends will securely engage the body against which it is held, whereby exterior swells are produced by a bulging out of such resilient ends, which extend out over the inner edge of the nut, substantially as shown and described.

In testimony whereof I have hereunto affixed my name in the presence of two witnesses.

MONROE WHITE.

Witnesses:
GEORGE A. BESSELL,
W. G. TRETHEWEY.